United States Patent [19]

Tabara et al.

[11] Patent Number: 4,899,711
[45] Date of Patent: Feb. 13, 1990

[54] ENGINE KNOCK CONTROL SYSTEM

[75] Inventors: Yoshitaka Tabara; Tetsuro Takaba; Tomotsugu Rikitake, all of Hiroshima, Japan

[73] Assignee: Mazda Motor Corporation, Hiroshima, Japan

[21] Appl. No.: 177,957

[22] Filed: Apr. 5, 1988

[30] Foreign Application Priority Data

Apr. 6, 1987 [JP] Japan .................................. 62-84464
Apr. 6, 1987 [JP] Japan .................................. 62-84466

[51] Int. Cl.⁴ .......................... F02P 5/15; F02D 41/04
[52] U.S. Cl. ...................................... 123/425; 123/435
[58] Field of Search ................................ 123/425, 435

[56] References Cited

U.S. PATENT DOCUMENTS

| 3,822,583 | 7/1974 | Keller et al. | |
|---|---|---|---|
| 4,565,087 | 1/1986 | Damson et al. | 73/35 |
| 4,617,895 | 10/1986 | Sakakibara et al. | 123/425 |
| 4,711,212 | 12/1987 | Haraguchi et al. | 123/425 |

FOREIGN PATENT DOCUMENTS

| 2731841 | 1/1979 | Fed. Rep. of Germany . |
| 3010324 | 1/1981 | Fed. Rep. of Germany . |
| 2916591 | 4/1981 | Fed. Rep. of Germany . |
| 3436557 | 10/1986 | Fed. Rep. of Germany . |
| 28646 | 2/1983 | Japan . |

Primary Examiner—Tony M. Argenbright
Attorney, Agent, or Firm—Sixbey, Friedman, Leedom & Ferguson

[57] ABSTRACT

Oscillation of the engine is detected by an oscillation sensor which outputs a signal representing the oscillation of the engine. The maximum value of the output of the oscillation sensor during combustion period in each cycle is detected. The maximum values obtained in a predetermined number of cycles are stored in a memory and knock occurrence is determined on the basis of the predetermined number of maximum values output from the memory.

7 Claims, 20 Drawing Sheets

F I G. 10
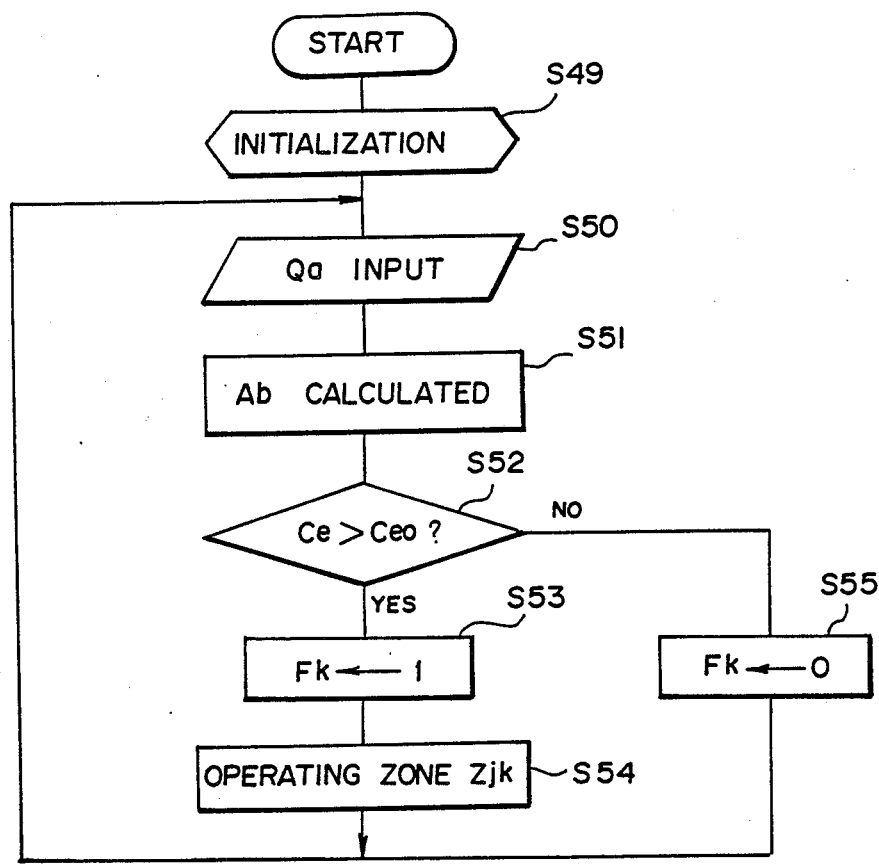

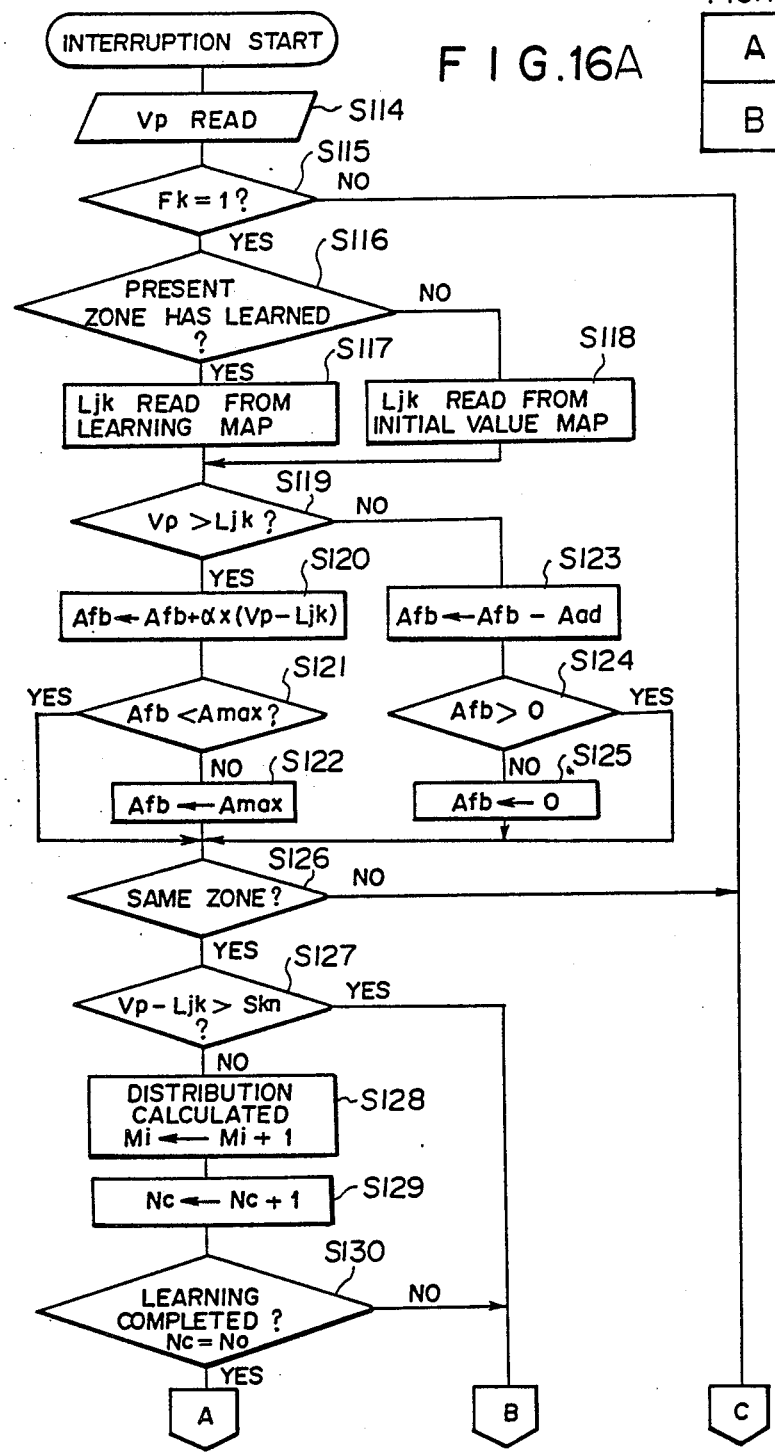

F I G. 22
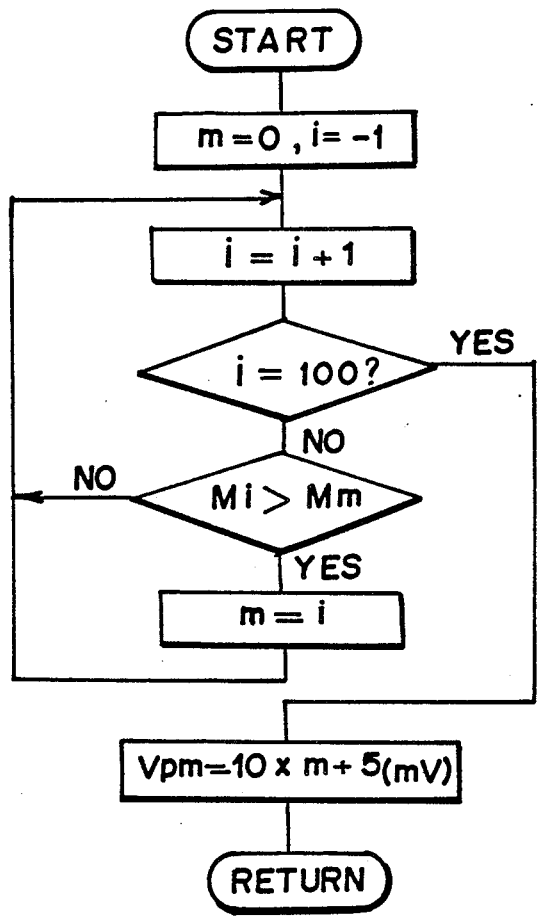

ENGINE KNOCK CONTROL SYSTEM

BACKGROUND OF THE INVENTION

1. Field of the Invention

This invention relates to an engine knock control system which detects engine knock occurrence and controls the ignition timing or the like to prevent engine knock. Further, this invention relates to an engine knock detecting system for detecting engine knock occurrence.

2. Description of the Prior Art

There has been known an engine knock control system which, when engine knock occurrence is detected, controls a factor governing combustion in the engine such as the ignition timing to suppress the engine knock. For example, in Japanese Unexamined Patent Publication No. 58(1983)-28646, output of a knocking sensor during nonknocking operation is averaged, a reference level is determined on the basis of the averaged output level of the knocking sensor, and when the output level of the knocking sensor exceeds the reference level, it is determined that engine knock occurs. The output of the knocking sensor during nonknocking operation bears noise normally generated by operation of the engine including, for instance, noise generated by opening and closure of the valves, and accordingly, when knocking occurs, the output of the knocking sensor comes to bear oscillation due to the knock (knock signal) superposed on such background noise. Therefore, the reference level must be accurately set between the output level of the sensor solely bearing the background noise and that bearing both the background noise and the knock signal. Otherwise knock detecting accuracy is deteriorated to adversely affect knock control.

However, both the background noise and the knock signal vary from engine to engine, and differ according to change of the engine with time, the engine speed, the environmental temperature and the like. Further, they are affected by detecting accuracy of a given knocking sensor, change of the knocking sensor with time, and the like. Accordingly, when the reference level is set to a constant level, the background noise can be mistaken for the knock signal or knock occurrence cannot be precisely detected, whereby the engine output can be unnecessarily suppressed or the engine knock cannot be suppressed to adversely affect the engine durability.

SUMMARY OF THE INVENTION

In view of the foregoing observations and description, the primary object of the present invention is to provide a knock control system which can precisely detect knock occurrence without affected by the background noise and can control occurrence of knock with high accuracy.

Another object of the present invention is to provide a knock detecting system which can precisely detect knock occurrence without affected by the background noise.

When the engine oscillation is detected by the knocking sensor and maximum oscillation Vp in the engine oscillation during knock occurrence period near TDC is detected at predetermined times, the statistical distribution characteristics of the maximum oscillation Vp is as shown in FIG. 2. Frequency Mi of maximum oscillations Vp during nonknocking operation, i.e., maximum levels of the background noise, is substantially normally distributed as shown by the solid line in FIG. 2. On the other hand, when knock occurs, the distribution characteristics of maximum oscillations Vp changes as shown by the broken line in FIG. 2 and the frequency at a higher level region is increased. This invention is based on this fact.

In accordance with the present invention, oscillation of the engine is detected by an oscillation sensor which outputs a signal representing the oscillation of the engine, and the maximum value of the output of the oscillation sensor during combustion period in each cycle is detected by a maximum value detecting means. The maximum values obtained in a predetermined number of cycles are stored in a memory and knock occurrence is determined on the basis of the predetermined number of maximum values output from the memory.

In accordance with one aspect of the present invention, the maximum value of the output signal of the oscillation sensor in a predetermined period during which knock occurs is obtained and the average of a predetermined number of maximum values is obtained through a statistical process. The average thus obtained substantially falls on the center of the normal distribution of the background noise. A reference level obtained by multiplying the average by a coefficient preset according to the engine speed and the charged volume is stored in a learning map and is output to a comparator according to the operating condition.

In accordance with another aspect of the present invention, the maximum value is detected a plurality of times and a maximum frequency value which is the value of the maximum value which appears most frequently is statistically obtained on the basis of the frequency distribution characteristics. Then the reference level is set on the basis of the distribution width on the lower level side of the maximum frequency value.

In accordance with still another aspect of the present invention, the maximum value is detected a plurality of times and a maximum frequency which is the number of the maximum values which appear most frequently is statistically obtained on the basis of the frequency distribution characteristics. Then the reference level is set on the basis of the average of the maximum values and the maximum frequency.

In accordance with still another aspect of the present invention, the maximum value is detected a plurality of times and a maximum frequency value which is the value of the maximum value which appears most frequently is statistically obtained on the basis of the frequency distribution characteristics. Then the reference level is set on the basis of the maximum frequency value.

BRIEF DESCRIPTION OF THE DRAWINGS

FIGS. 10, 11, 12, 12A and 12B are flow charts for showing the operation of the engine control unit in a second embodiment of the present invention, FIG. 14, 15, 16, 16A and 16B are flow charts for showing the operation of the engine control unit in a third embodiment of the present invention.

DESCRIPTION OF THE PREFERRED EMBODIMENTS

Figure 1:
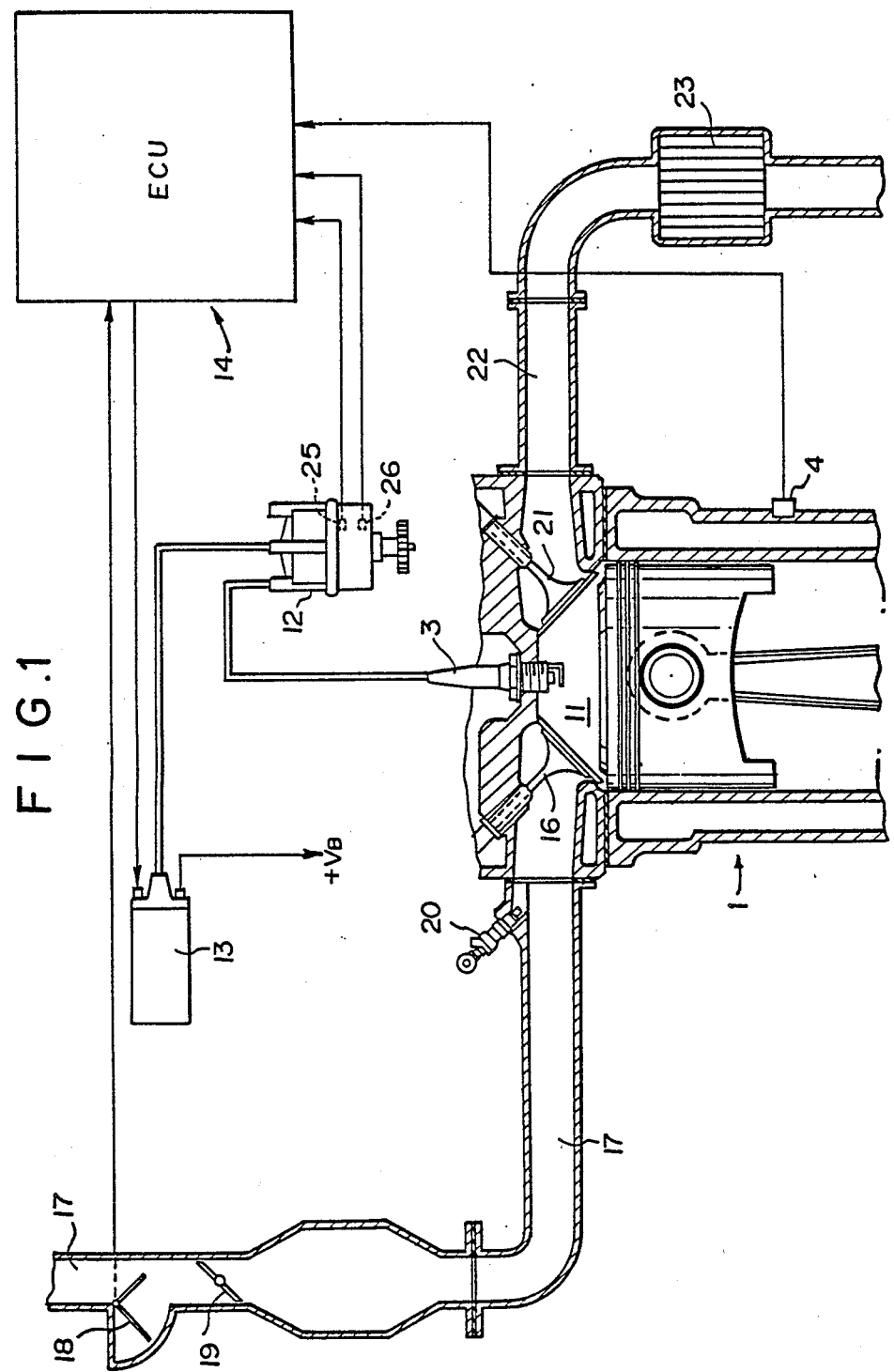
FIG. 1 is a schematic view showing an engine provided with a knock control system in accordance with a first embodiment of the present invention.
Figure 2:
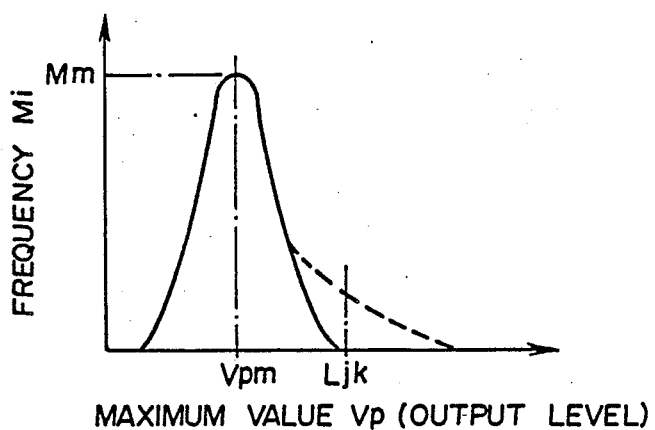
FIG. 2 is a view for illustrating an example of the distribution for maximum values of the output of the knocking sensor.

In FIG. 1, an engine 1 has a combustion chamber 11 provided with a spark plug 3. The spark plug 3 is connected to an ignition coil 13 by way of a distributor 12. An ignition signal is input into the ignition coil 13 from an engine control unit 14 to control the ignition timing.

An intake passage 17 opens to the combustion chamber 11 by way of an intake valve 16, and an airflow meter 18 for detecting the amount of intake air, a throttle valve 19, a fuel injector 20 are provided in the intake passage 17 in this order from the upstream side of the intake passage 17. Further, an exhaust passage 22 opens to the combustion chamber 11 by way of an exhaust valve 21. The exhaust passage 22 is provided with a catalytic converter 23. A knocking sensor 4 is provided to detect engine oscillation. A first crank angle sensor 25 which outputs a first crank angle signal at a predetermined crank angle (60 to 90 degrees ATDC) and a second crank angle sensor 26 which outputs a second crank angle signal at another predetermined crank angle (30 to 0 degrees BTDC) are mounted on the distributor 12. The first and second crank angle signals from the sensor 25 and 26 are input into the engine control unit 14.

The engine control unit 14 determines a basic ignition timing on the basis of the engine speed and the engine load according to the signals from various sensors. The engine control unit 14 detects knock occurrence on the basis of comparison of the detecting signal of the knocking sensor 4 with a reference level based on a learning value, and retards the ignition timing to suppress knock when knock occurs while sets a feedback correction to gradually advance the ignition timing when knock occurrence is not detected. The maximum value of the output of the knocking sensor 4 (peak voltage) during the knock occurrence period near TDC is input into the engine control unit 14 a predetermined times, and the engine control unit 14 averages the maximum values and updates the learning value for the reference level by multiplying the average of the maximum values by a predetermined coefficient. The final ignition timing is set on the basis of the basic ignition timing and the feedback correction value.

Figure 3:
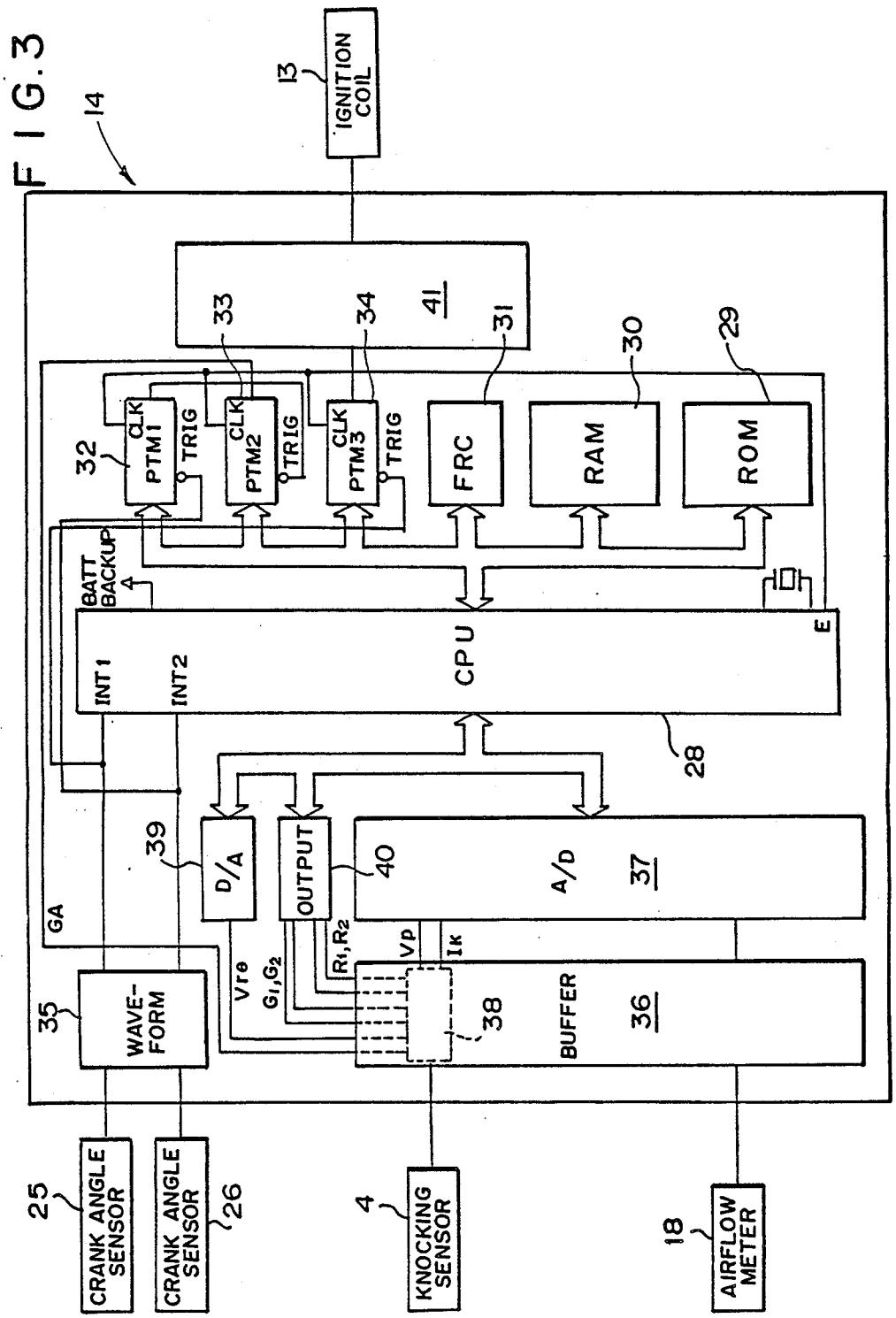
FIG. 3 is a block diagram for illustrating the structure of the engine control unit.

As shown in FIG. 3, the engine control unit 14 comprises a CPU 28, a ROM 29 in which operational program is stored, a RAM 30 for storing the learning value and the like, a free running counter 31 and first to third PTMs (program timer) 32 to 34 which sets times under the control of the CPU 28. The first and second crank angle signals are input into the CPU 28 as interruption signals by way of a waveform shaping circuit 35. Further, into the CPU 28 are input an intake air amount signal from the airflow meter 18 and the detecting signal of the knocking sensor 4 by way of an analog buffer 36 and an A/D convertor 37.

The detecting signal of the knocking sensor 4 is processed by a knock detecting circuit 38 (shown in detail in FIG. 4) of the analog buffer 36 on the basis of a gate signal GA from the first and second PTMs 32 and 33, a reference level signal Vre from a D/A convertor 39, reset signals R1 and R2 from an output port 40 and gain control signals G1 and G2, and a maximum value signal Vp (peak voltage) during the knock occurrence period and a knock intensity signal Ik (integral voltage) as the result of comparison are input into the CPU 28. The third PTM 34 is set according to an ignition timing as the result of operation of the CPU 28, and is triggered by the first crank angle signal from the first crank angle sensor 25. The output signal of the third PTM 34 is delivered to the ignition coil 13 as an ignition signal by way of an output interface 41.

Figure 4:
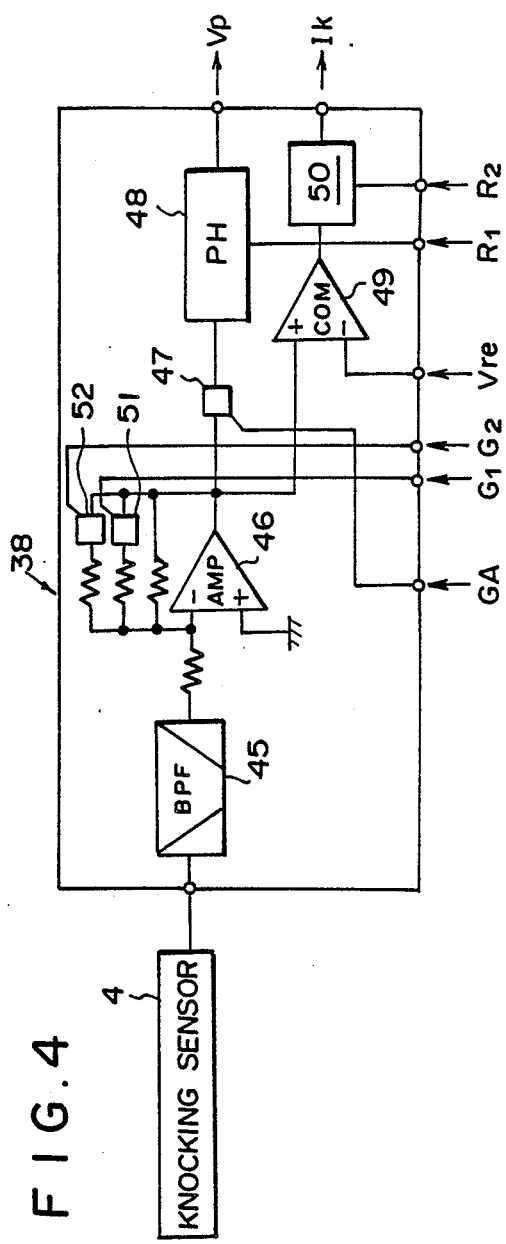
FIG. 4 is a block diagram of the knock detecting circuit.

As shown in FIG. 4, the knock detecting circuit 38 includes a BPF (bandpass filter) 45 which receives the detecting signal of the knocking sensor 4 and extracts the knock frequency component. The bandpass filtered signal is amplified by an input AMP 46, and only the bandpass filtered signal during the knock occurrence period (from 10 degrees to 50 degrees ATDC) is input into a peak holding circuit 48 and a comparator 49 in response to gate opening and closing operation of an analog switch 47 under the control of said gate signal GA. The peak holding circuit 48 holds the peak value during the gate opening time, thereby obtaining the maximum value Vp and is reset by the reset signal R1. Into the comparator 49 is input the reference level signal Vre, and the bandpass filtered signal higher than the reference level signal Vre is input into an integrator 50 and an integrated value Ik (the knock intensity signal) during the gate opening time is obtained. The integrator 50 is reset by the reset signal R2.

The output of the knocking sensor 4 changes according the engine speed, and accordingly, in order to stabilize the output of the input AMP 46 within a predetermined range, the gain control signals G1 and G2 are input, according to the engine speed, respectively into analog switches 51 and 52 (which are provided for gain control resistors connected in parallel to the input AMP 46) to open and close the switches 51 and 52, thereby controlling the gain of the input AMP 46.

Figure 5:
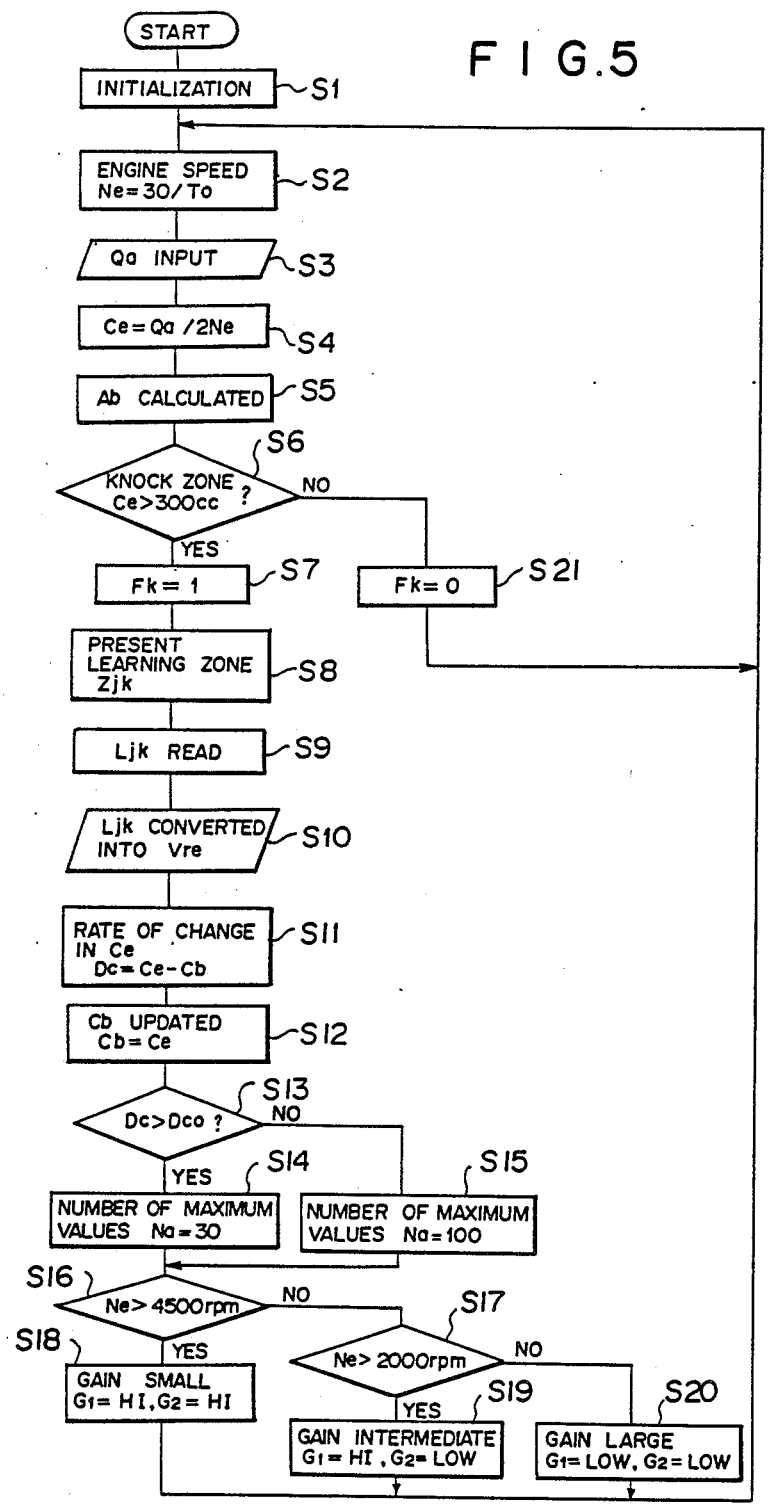
FIG. 5 is a flow chart showing the main routine of the engine control unit in the first embodiment.

The operation of the control unit 14 will be described with reference to the flow charts shown in FIGS. 5 to 7, hereinbelow. FIG. 5 shows a main routine. Step S1 is an initialization step. In step S2, the engine speed Ne is calculated on the basis of TDC cycle To derived from the crank angle signal. In step S3, the intake air amount Qa is read from the output of the airflow meter 18. Then the charged volume Ce representing the engine load is calculated on the basis of the engine speed Ne and the intake air amount Qa, and a basic ignition timing Ab is calculated from a basic map in which the engine speed Ne and the charged volume Ce are related. (Steps S4 and S5)

Figure 8:
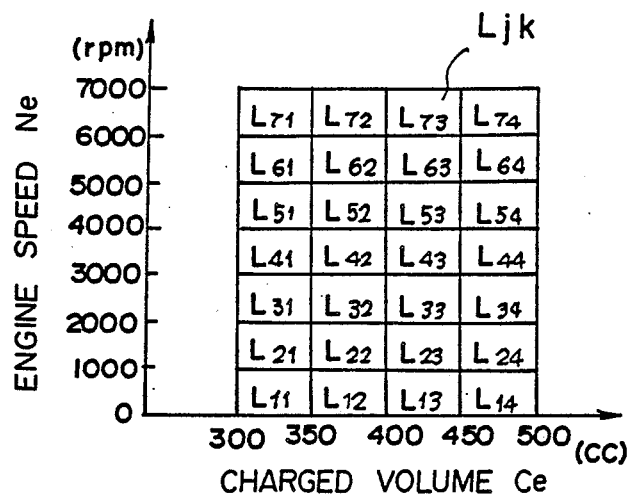
FIG. 8 is a map for illustrating an example of the manner for setting the learning map.

In step S6, it is determined whether the operating condition is in the knock zone on the basis of the charged volume Ce. When it is determined that the operation condition is in the knock zone, a knock control flag Fk is set to 1 in step S7, and then the present learning zone Zjk is obtained from a zone map of the engine speed Ne and the charged volume Ce in step S8. In step S9, a learning value Ljk is read from a learning map corresponding to the present learning zone Zjk. In step S10, the learning value Ljk is converted into a voltage Vre as the reference level and delivered to the D/A convertor 39. In the zone map, the operating condition is zoned into a plurality of zones Zjk on the basis of the engine speed Ne and the charged volume Ce, and in the learning map, the learning values Ljk of the reference level are stored in zones corresponding to the zone map as shown in FIG. 8.

In step S11, the rate of change Dc in the charged volume Ce on the basis of the difference between the present charged volume Ce and the preceding charged volume Cb, and then in step S12, the preceding charged volume Cb is updated. In step S13, it is determined whether the vehicle is accelerated on the basis of whether the rate of change Dc in the charged volume Ce is not smaller than a predetermined value Dco. When it is determined that the vehicle is accelerated, the number Na of the maximum values to be averaged is set to a relatively small value, i.e., 30 in this particular embodiment in order to obtain better response in step S14. On the other hand when it is determined in the Step S13 that the vehicle is not accelerated, the number Na of the maximum values to be averaged is set to a relatively large value, i.e., 100 in this particular embodiment in order to obtain better control stability in step S15.

Steps S16 to S20 are for controlling the gain of the input AMP 46 according to the engine speed Ne. In the step S16, it is determined whether the engine speed Ne is in the high speed range higher than 4500 rpm, and in the step S17, it is determined whether the engine speed Ne is in the intermediate speed range between 2000 rpm and 4500 rpm. When it is determined that the engine speed Ne is in the high speed range, the gate signals G1 and G2 are turned to high level in the step S18 to close the analog switches 51 and 52 so that the gain of the input AMP becomes small. When it is determined that the engine speed is in the intermediate speed range, the gate signal G1 is turned to high level to close the analog switch 51 and the gate signal G2 is turned to low level to open the analog switch 52 so that the gain of the input AMP 46 becomes intermediate. (Step S19) When it is determined that the engine speed Ne is in the low speed range, both the gate signals G1 and G2 are turned to low level to open both the analog switches 51 and 52 so that the gain of the input AMP 46 becomes large.

When it is determined in the step S6 that the operating condition is not in the knock zone, the flow proceeds to step S21 and the knock control flag Fk is cleared to 0.

Figure 6:
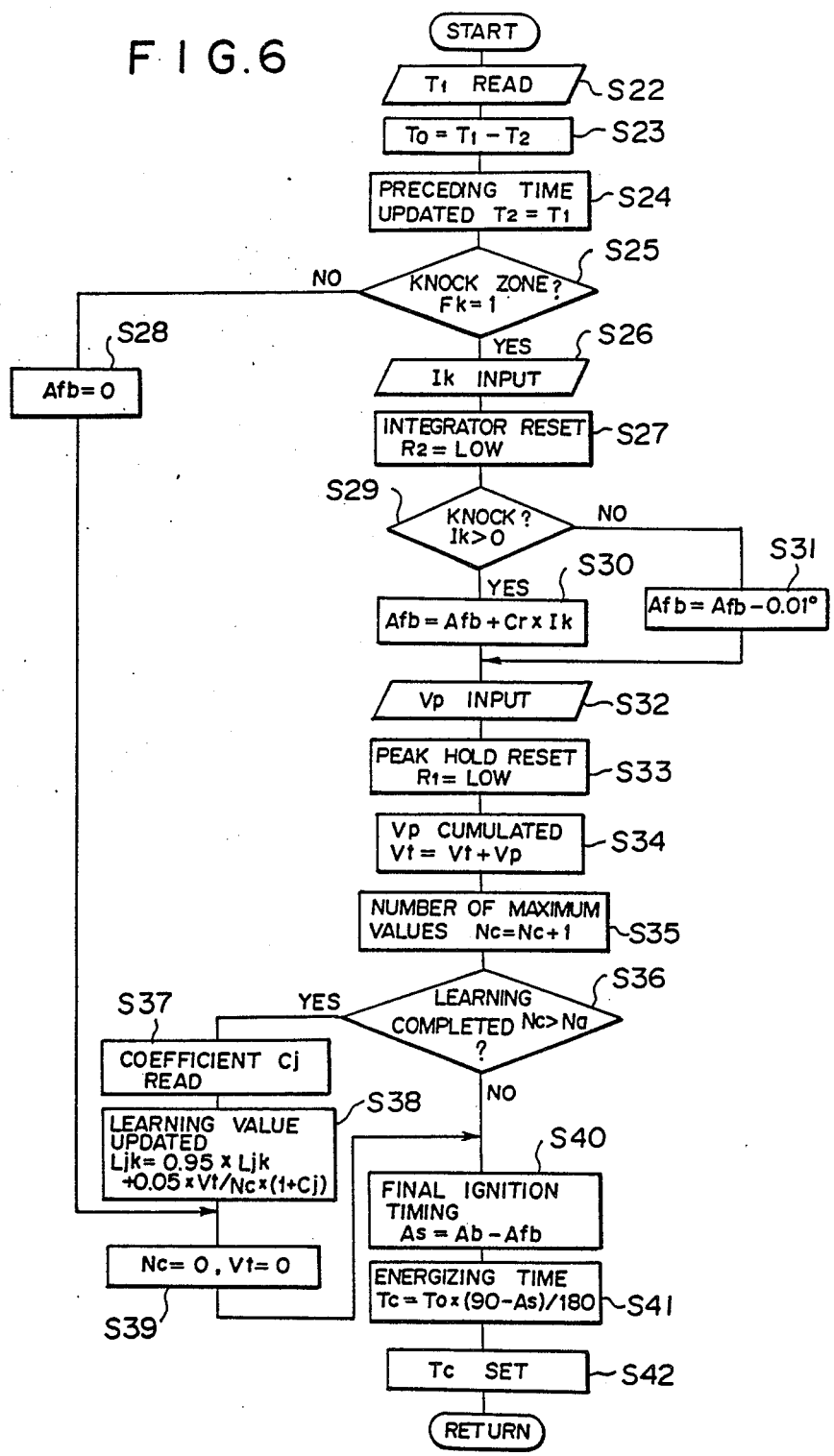
FIG. 6 is a flow chart showing a first interrupt routine of the engine control unit in the first embodiment.

FIG. 6 shows an interrupt routine which is started by a signal input every 60 degrees ATDC. In step S22, an interrupt time T1 is read from the free running counter 31, and in step S23, the TDC cycle To, the time required for the crankshaft to make a half revolution (180°), is calculated on the basis of the difference between the present interrupt time T1 and the preceding interrupt time T2. Thereafter, the preceding interrupt time T2 is updated in step S24.

In step S25, it is determined on the basis of the knock control flag Fk set in the main routine whether the operating condition is in the knock zone. When it is determined that the operating condition is in the knock zone, the knock intensity Ik is read from the knock detecting circuit 38 in step S26, and a reset signal R2 at low level is input into the integrator 50 to reset the knock intensity Ik in step S27. On the other hand, when it is determined in the step S25 that the operating condition is not in the knock zone, the feedback correction value Afb is cleared to 0 in step S28.

In step S29, it is determined whether knock occurs on the basis of whether the knock intensity Ik is detected. When it is determined that the knock occurs, the feedback correction value Afb is corrected to retard the ignition timing according to the knock intensity Ik (Afb=Afb+Cr×Ik, Cr being a coefficient) in step S30. On the other hand, when it is determined that knock does not occur, the feedback correction value Afb is corrected to advance the ignition timing by a predetermined value in step S31.

After the feedback correction value Afb is corrected in the manner described above, the maximum value Vp (peak voltage) is input from the peak holding circuit 48 in step S32. Then in step S33, a reset signal R1 at low level is output to the peak holding circuit 48 to reset the maximum value Vp. In step S34, a cumulative value Vt of the maximum values Vp is obtained and the number Nc of the maximum values Vp cumulated is calculated.

Figure 9:
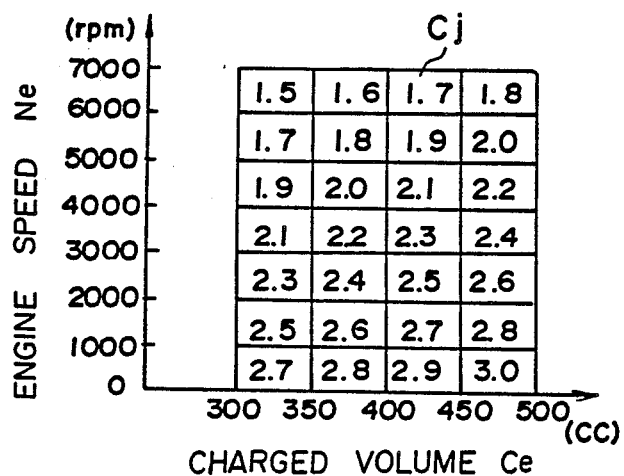
FIG. 9 is a map for illustrating an example of the manner for setting the coefficient for obtaining the reference level.

In step S36, it is determined whether the number Nc of the cumulated maximum values Vp reaches the number Na set in the step S14 or S15 (30 or 100), thereby determining whether learning is completed. When it is determined that learning completed, a reference level preparation coefficient Cj corresponding to the present learning zone Zjk is read from a map in step S37. As shown in FIG. 9, in the map, the coefficients Cj are allocated to respective zones, which are divided according to the engine speed Ne and the charged volume Ce corresponding to the zones in the learning map, so that the value of the coefficient Cj allocated to a given zone is reduced as the engine speed Ne increases and increased as the charged volume Ce increase. That is, the coefficient Cj is for obtaining a level corresponding to the noise distribution width from the average, and is set taking into account the fact that the noise distribution width becomes narrower as the engine speed Ne increases and becomes wider as the charged volume Ce increases.

Then in step S38, the learning value Ljk of the present learning zone Zjk is updated on the basis of the average of the maximum values Vp (cumulative value Vt/the number of the cumulated maximum values Vp) and the coefficient Cj, and in step S39, registers Nc, Vt for learning are cleared. This updating of the learning value Ljk is effected by multiplying 5% of the average Vt/Nc by coefficient (1+Cj) and adding the product to 95% of the preceding learning value to avoid large fluctuation of the learning value.

On the basis of the basic ignition timing Ab and the feedback correction value Afb obtained in the manner described above, the final ignition timing As is calculated in step S40. In step S41, the time Tc between 90 degrees BTDC at which the first crank angle signal from the first crank angle sensor 25 turns to low level and the final ignition timing As (energizing time) is calculated, and in step S42, the third PTM 34 is set according to the energizing time. The third PTM 34 is triggered by the crank angle signal at 90 degrees BTDC and the ignition signal is output after the time Tc.

Figure 7:
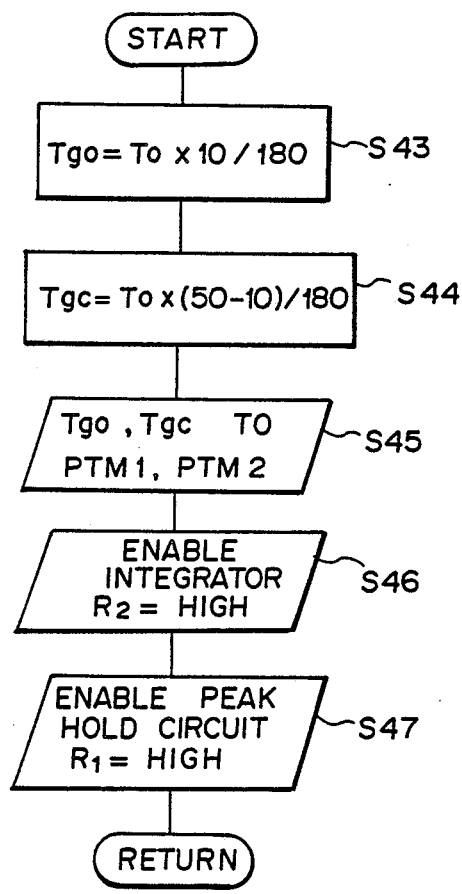
FIG. 7 is a flow chart showing a second interrupt routine of the engine control unit in the first embodiment.

FIG. 7 shows a second interrupt routine which starts every 30 degrees BTDC and which is for setting and outputting the gate signal GA for the analog switch 47 in the knock detecting circuit 38. In step S43, the time interval Tgo from the TDC to 10 degrees ATDC at which the analog switch 47 is opened is calculated, and in step S44, the time interval Tgc from 10 degrees ATDC to 50 degrees ATDC at which the analog switch 47 is closed is calculated. In step S45, the time intervals Tgo and Tgc are respectively output to the first and second PTMs 32 and 33 to open the analog switch 47 Tgo after TDC and to close the same Tgc thereafter, thereby preventing noise generated by closure of the intake valve from being input into the peak holding circuit 48 and the comparator 48. Further, reset signals R1 and R2 at high level are output to the integrator 50 and the peak holding circuit 48, which have been reset at the steps S27 and S33, to enable them to operate. (steps S46 and S47)

In the embodiment described above, the maximum value Vp of the detecting signal of the knocking sensor 4 in a predetermined period during which knock occurs is obtained and the average of a predetermined number of maximum values Vp is obtained through a statistical process. The average thus obtained substantially falls on the center of the normal distribution of the background noise. A reference level obtained by multiplying the average by the coefficient Cj preset according to the engine speed and the charged volume is stored in the learning map and is output to the comparator 49 according to the operating condition. The comparator 49 compares the reference level with the output of the knocking sensor 4 and outputs to the integrator a signal the voltage of which changes according to the knock intensity. According to the output signal, the ignition timing is feedback-controlled to suppress the knock.

A second embodiment of the present invention will be described, hereinbelow, with reference to FIGS. 10 to 12. In the second embodiment, the maximum value Vp is detected a plurality of times and a maximum frequency value Vpm which is the value of the maximum value Vp which appears most frequently is statistically obtained on the basis of the frequency distribution characteristics. Then the reference level is set on the basis of the distribution width on the lower level side of the maximum frequency value Vpm. The second embodiment is substantially the same as the first embodiment in the mechanical and electronic arrangement except that the control to be made by the control unit differs from that of the first embodiment and that the knock detecting circuit 38 is not provided with the comparator 49 and the integrator 50 and knock occurrence is detected on the basis of the maximum value Vp. In the flow charts shown in FIGS. 10 to 12, gain control of the input AMP 46 and gate control for the analog switch 47 are omitted.

FIG. 10 shows a main routine. Step S49 is an initialization step. In step S50, the intake air amount Qa is read from the output of the airflow meter 18. A basic ignition timing Ab (ignition advancing angle) is calculated on the basis of the intake air amount Qa and the engine speed Ne in step S51. In step S52, it is determined whether the operating condition is in the knock zone on the basis of whether the charged volume Ce is larger than a predetermined value Ceo. When it is determined that the operation condition is in the knock zone, a knock control flag Fk is set to 1 in step S53, and then the operating zone Zjk is calculated from the engine speed Ne and the charged volume Ce in step S54. When it is determined in the step S52 that the operation condition is in nonknock zone, the knock control flag Fk is cleared to 0 in step S55.

Figure 11:
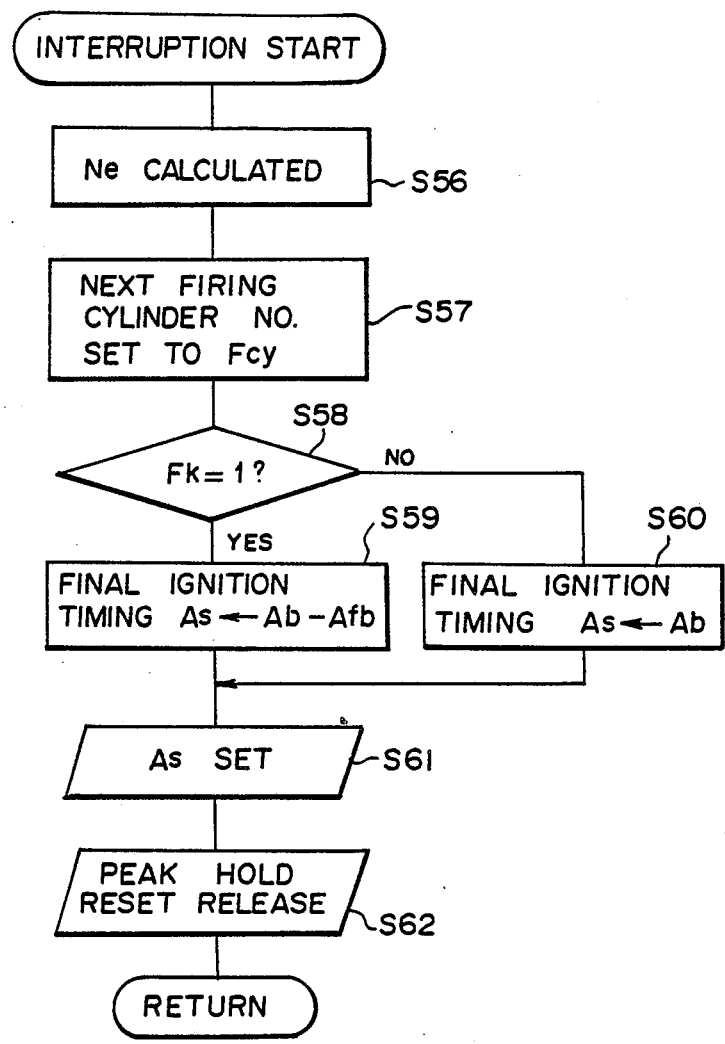

FIG. 11 shows an interrupt routine. In step S56, the engine speed Ne is calculated on the basis of the interruption cycle To. In step S57, the number of next firing cylinder is set to a cylinder flag Fcy on the basis of a signal from a cylinder sensor, for instance. Then in step S58, it is determined whether the knock control flag Fk is 1, thereby determining whether the operating condition is in the knock zone. When it is determined that the operating condition is in the knock zone, the basic ignition timing Ab is corrected by a feedback correction value Afb obtained in a second interrupt routine to be described later, thereby obtaining a final ignition timing As in step S59. Otherwise, the basic ignition timing Ab is adopted as the final ignition timing As as it is. (step S60) Then PTM 34 is set on the basis of the ignition time calculated from the final ignition timing As in step S61, and the peak holding circuit is released in step S62.

Figure 12A:
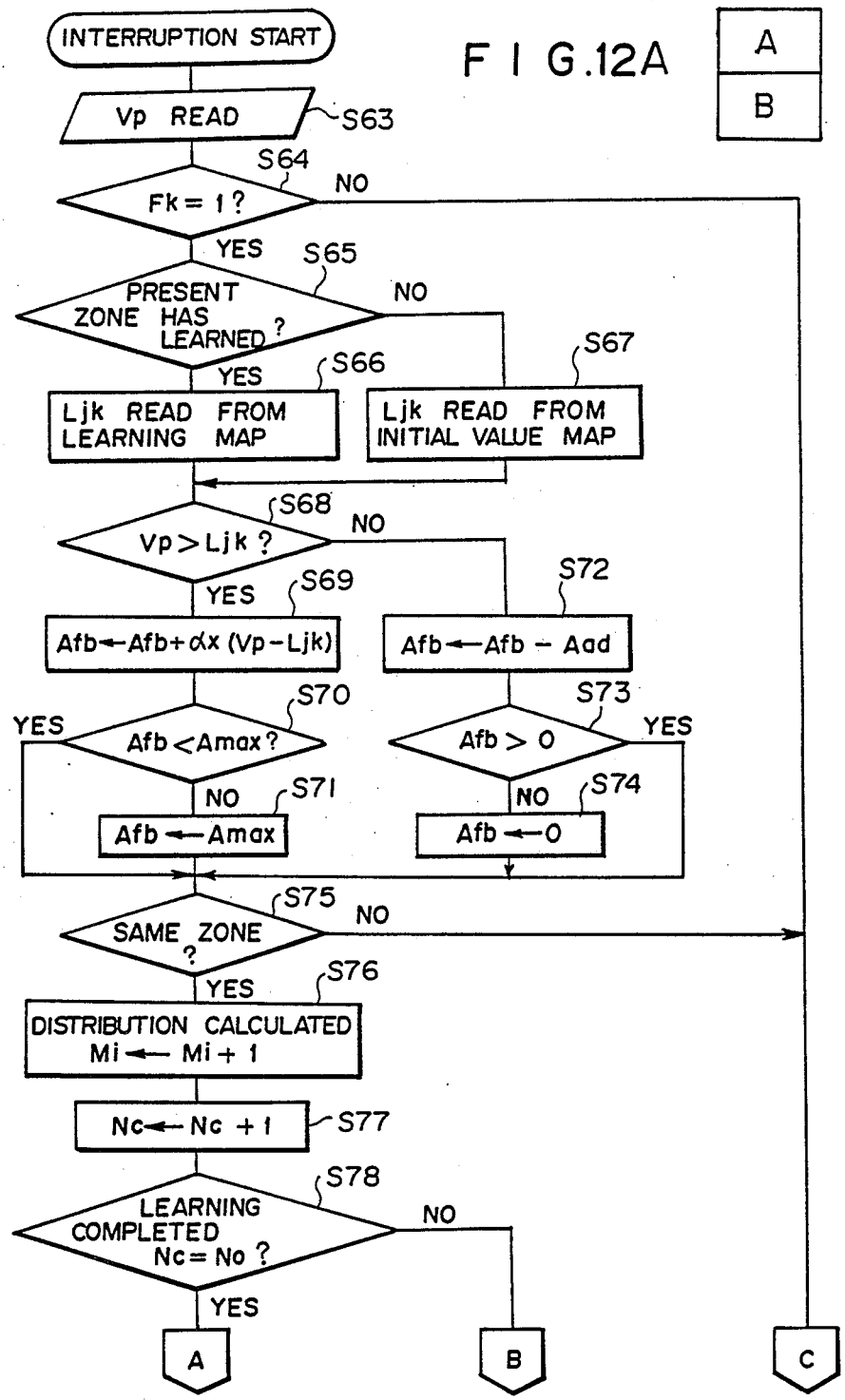
Figure 12B:
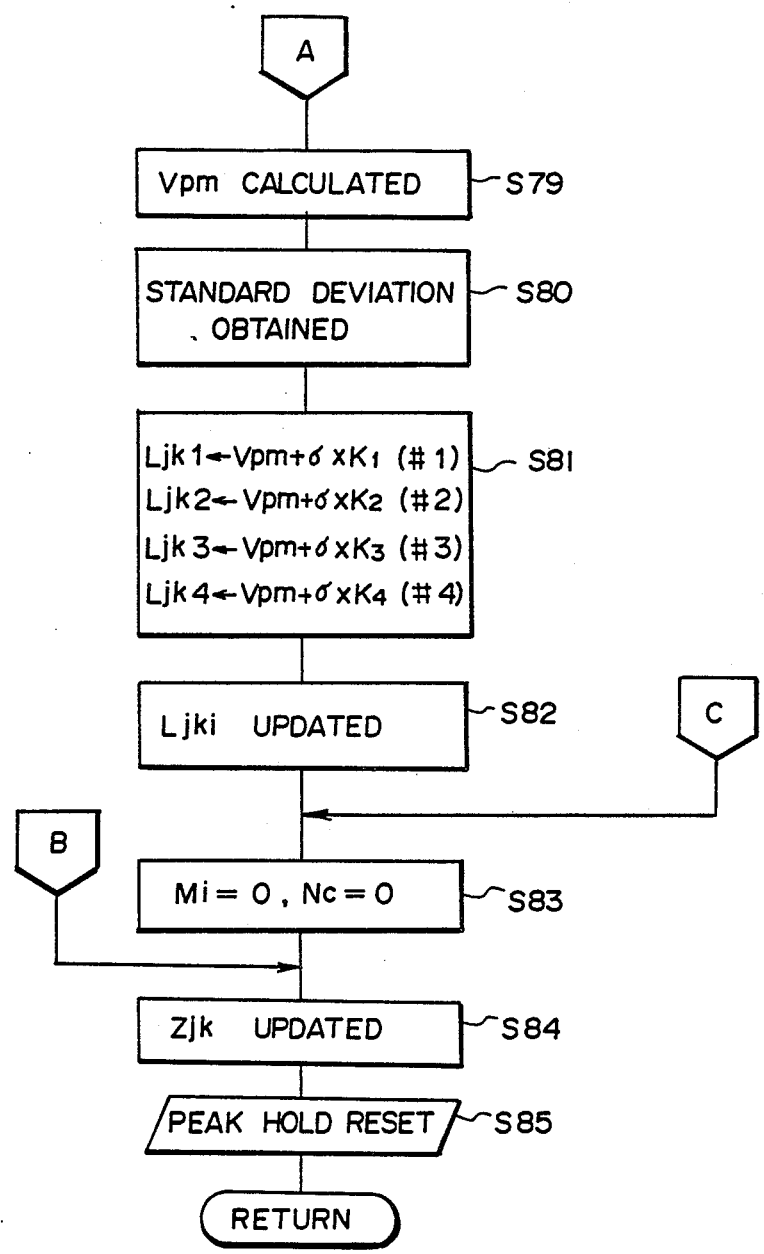

FIG. 12 shows a second interrupt routine. The maximum value Vp of the output of the knocking sensor 4 during the knock occurrence period is read in step S63. Then in step S64, it is determined whether the knock control flag Fk is 1, thereby determining whether the operating condition is in the knock zone. When it is determined that the operating condition is in the knock zone, it is determined whether the present operating zone Zjk has ever learned in step S65. When it is determined that the present operating zone Zjk has learned, the reference level Ljk for the present cylinder number Fcy is read from the learning map in step S66. On the other hand, when it is determined than the present operating zone Zjk has not learned, the reference level Ljk for the present cylinder number Fcy is read from an initial value map in step S67.

In step S68, it is determined whether the maximum value Vp is larger than the reference level Ljk. When it is determined that the former is larger than the latter, that is, when it is determined that knock occurs, the feedback correction value Afb is corrected to retard the ignition timing by adding to the feedback correction value Afb the product of the difference between the maximum value Vp and the reference level Ljk and a predetermined coefficient α in step S69. Then in step S70, it is determined whether the corrected feedback correction value Afb is larger than an upper limit Amax. When it is determined that the former is larger than the latter, the feedback correction value Afb is limited to the upper limit Amax in step S71. On the other hand, when it is determined in the step S68 that knock does not occur, the feedback correction value Afb is corrected to advance the ignition timing by subtracting a predetermined value Aad from the feedback correction value Afb in step S72. Then in step S73, it is determined whether the corrected feedback correction value Afb is larger than 0. When it is determined that the former is smaller than the latter, the feedback correction value Afb is limited to 0 in step S74.

In step S75, it is determined whether the present operating zone Zjk is the same as the preceding operating zone. When it is determined that the present operating zone $Zjk$ is the same as the preceding operating zone, the memory value $Mi$ corresponding to the level of the present maximum value $Vp$ input into a memory for distribution calculation is incremented, the frequency of the maximum value $Vp$ of the level is obtained and the number $Nc$ of the cumulated maximum values $Vp$ is calculated in order to calculate the distribution for the maximum values $Vp$. (steps S76 and S77)

Then in step S78, it is determined whether learning is completed on the basis of whether the number of the cumulated maximum values $Vp$ reaches a predetermined value No. When it is determined that learning is completed, the maximum value $Vmp$ corresponding to the maximum point $Mm$ at which the frequency for the maximum value $Vp$ is maximum is retrieved from the memory for distribution calculation. (step S79) For example, this retrieval can be effected by repeating comparison of a pair of memory values $Mi$ with each other while eliminating smaller ones and adopting as the maximum frequency value $Vpm$ the output level corresponding to the memory number of the memory value $Mm$ determined to be larger at the final comparison.

Figure 13:
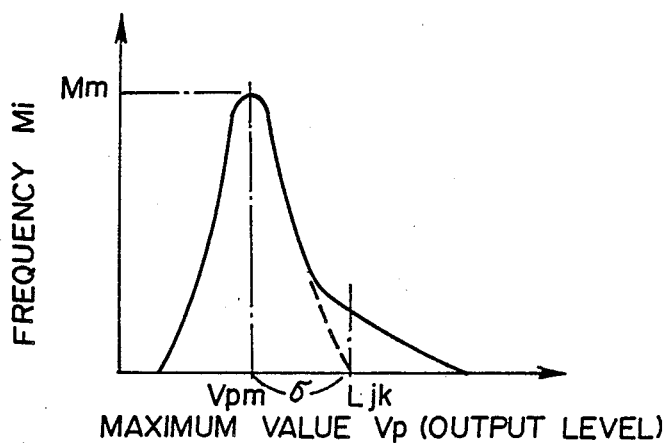
FIG. 13 is a view for illustrating the setting characteristics of the reference level against the distribution characteristics in the second embodiment.

In step S80, the standard deviation $\sigma$ in the distribution obtained by folding back the distribution on the lower level side of the maximum frequency value $Vpm$ in the maximum value distribution (See FIG. 13) toward the higher level side at the maximum frequency value $Vpm$ is obtained, or in other words, the background noise distribution is obtained. In step S81, the reference level $Ljki$ is calculated for each cylinder The reference level $Ljki$ is obtained by adding the product of the standard deviation $\sigma$ and a cylinder coefficient $Ki$ to the maximum frequency value $Vpm$.

The reference levels $Ljki$ for the respective cylinders are written in predetermined zones $Zjk$ of a reference level learning map allocated to the respective cylinders to update the learning value in step S82. Then registers $Mi$ and $Nc$ for distribution calculation are cleared in step S83, the preceding zone $Zjk$ is updated in step S84, and the peak holding circuit 48 is reset in step S85.

When the operating condition changes to the nonknock zone and it is determined in the step S64 that the operating condition is not in the knock zone, or when the operating condition is changed within the knock zone and it is determined in the step S75 that the present operating zone $Zjk$ differs from the preceding operating zone, the flow directly proceeds to the step S83 and learning of the reference level is interrupted.

In this embodiment, the maximum frequency value $Vpm$ which is hardly affected by presence of knock occurrence is obtained as the statistical characteristic value of the maximum value $Vp$, and the reference level $Ljk$ is set for each cylinder, thereby further improving knock detecting accuracy and knock control accuracy.

A third embodiment of the present invention will be described, hereinbelow, with reference to FIGS. 14 to 16. In the third embodiment, the maximum value $Vp$ is detected a plurality of times and a maximum frequency $Mm$ which is the number of the maximum values $Vp$ which appear most frequently is statistically obtained on the basis of the frequency distribution characteristics. Then the reference level is set on the basis of the average of the maximum values $Vp$ and the maximum frequency $Mm$. The third embodiment is substantially the same as the first embodiment in the mechanical and electronic arrangement except that the control to be made by the control unit differs from that of the first embodiment.

Figure 14:
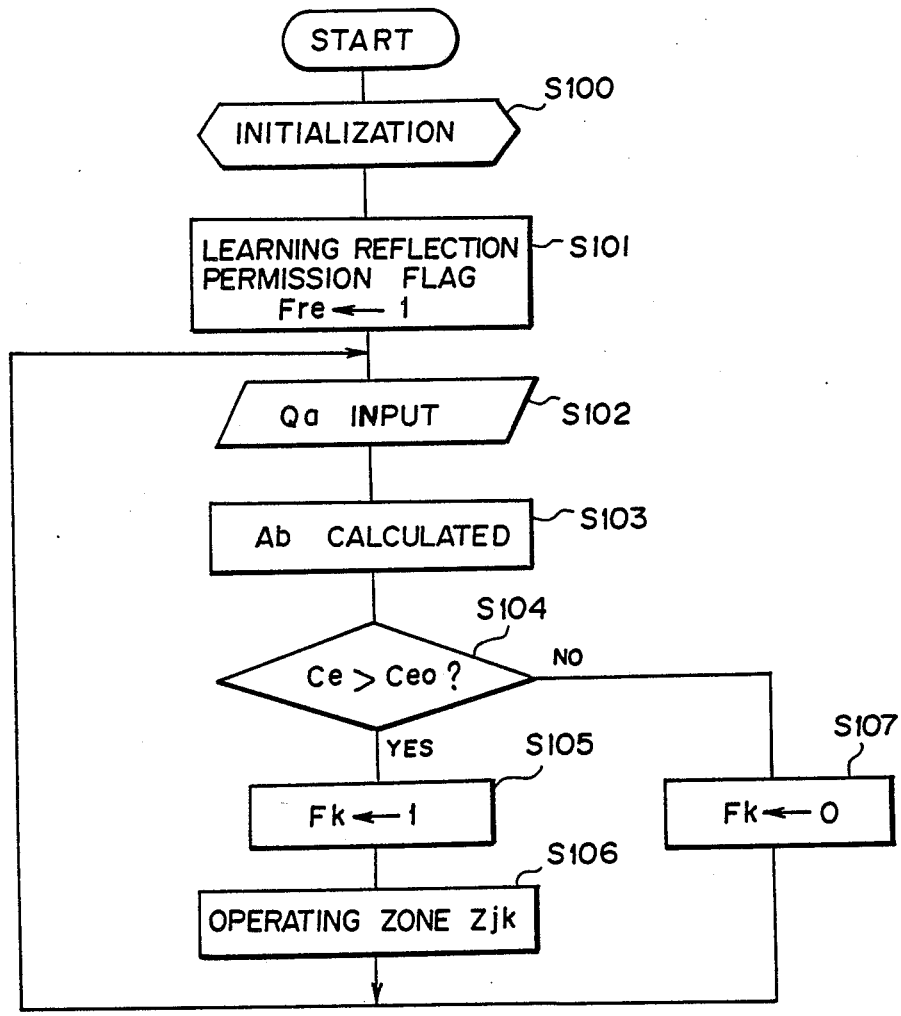

FIG. 14 shows a main routine. Step S100 is an initialization step. In step S101, a learning reflection permission flag $Fre$ is set to 1. This flag $Fre$ is for only once reflecting a change of the learning value $Ljk$ for a learning zone $Zjk$ on other learning zones when the learning zone $Zjk$ learns for the first time after the engine is started and the learning value $Ljk$ changes by an amount larger than a predetermined value.

In step S102, the intake air amount $Qa$ is read from the output of the airflow meter 18. A basic ignition timing $Ab$ is calculated on the basis of the intake air amount $Qa$ and the engine speed $Ne$ in step S103. In step S104, it is determined whether the operating condition is in the knock zone on the basis of whether the charged volume $Ce$ is larger than a predetermined value $Ceo$. When it is determined that the operation condition is in the knock zone, a knock control flag $Fk$ is set to 1 in step S105, and then the operating zone $Zjk$ is calculated from the engine speed $Ne$ and the charged volume $Ce$ in step S106. When it is determined in the step S104 that the operation condition is in nonknock zone, the knock control flag $Fk$ is cleared to 0 in step S107.

Figure 15:
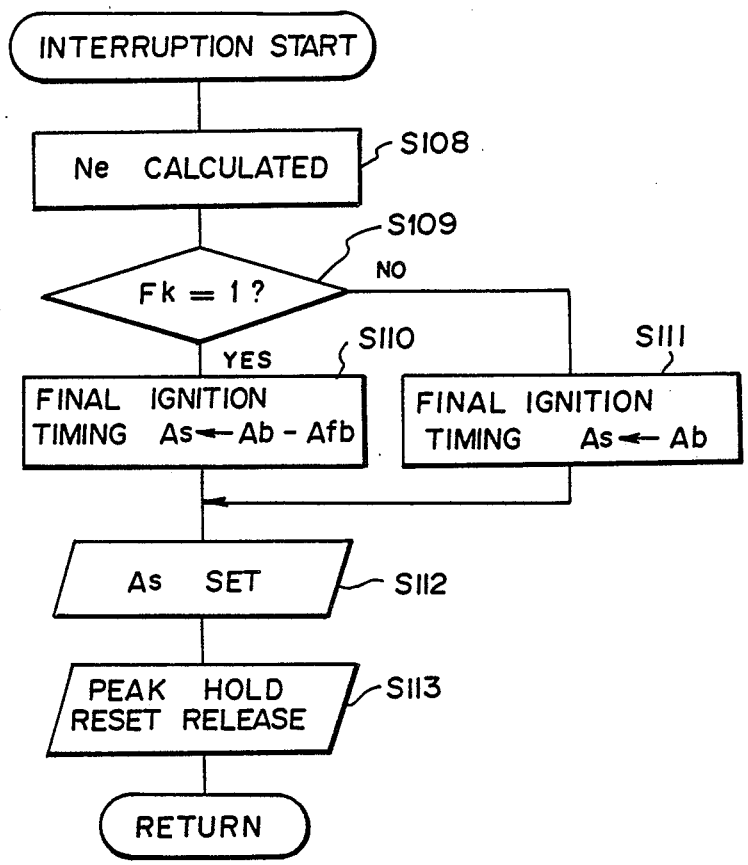

FIG. 15 shows an interrupt routine. In step S108, the engine speed $Ne$ is calculated on the basis of the interruption cycle $To$. In step S109, it is determined whether the knock control flag $Fk$ is 1, thereby determining whether the operating condition is in the knock zone. When it is determined that the operating condition is in the knock zone, the basic ignition timing $Ab$ is corrected by a feedback correction value $Afb$ obtained in a second interrupt routine to be described later, thereby obtaining a final ignition timing $As$ in step S110. Otherwise, the basic ignition timing $Ab$ is adopted as the final ignition timing $As$ as it is. (step S111) Then PTM 34 is set on the basis of the ignition time calculated from the final ignition timing $As$ in step S112, and the peak holding circuit is released in step S113.

Figure 16B:
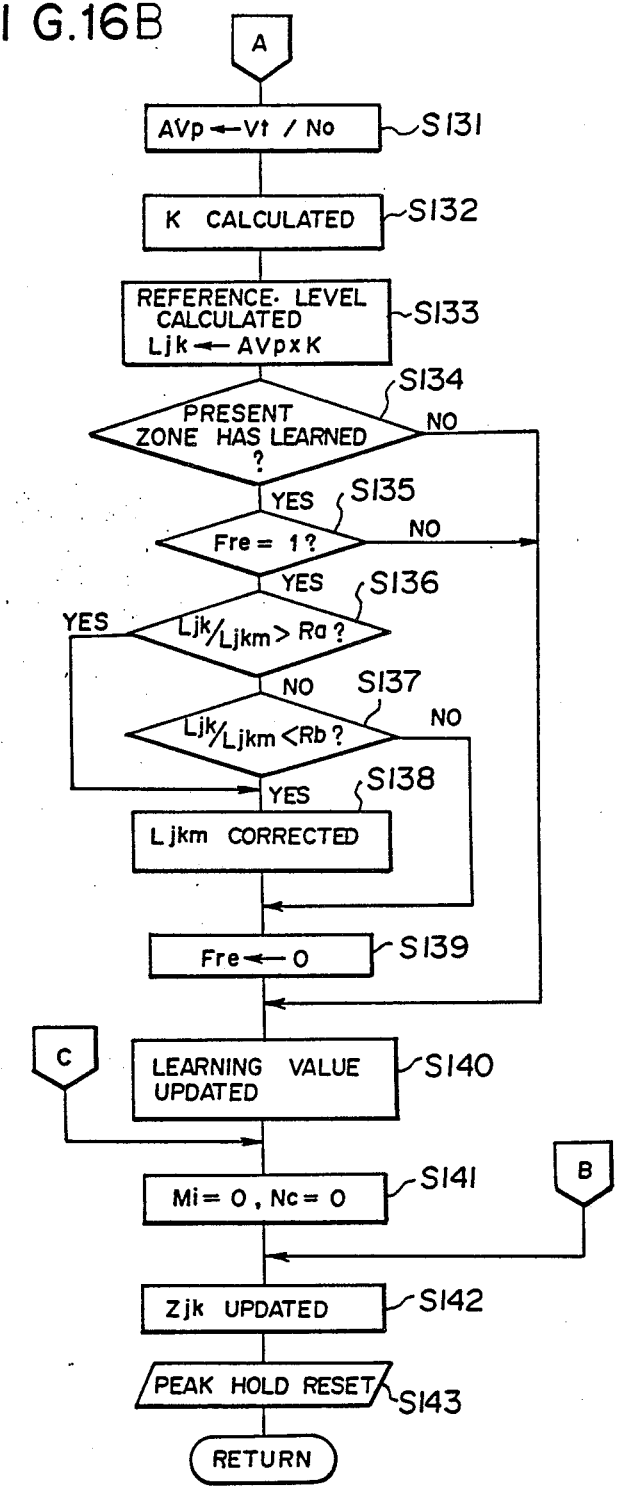

FIG. 16 shows a second interrupt routine. The maximum value $Vp$ of the output of the knocking sensor 4 during the knock occurrence period is read in step S114. Then in step S115, it is determined whether the knock control flag $Fk$ is 1, thereby determining whether the operating condition is in the knock zone. When it is determined that the operating condition is in the knock zone, it is determined whether the present operating zone $Zjk$ has ever learned in step S116. When it is determined that the present operating zone $Zjk$ has learned, the reference level $Ljk$ for the present operating zone $Zjk$ is read from the learning map in step S117. On the other hand, when it is determined than the present operating zone $Zjk$ has not learned, the reference level $Ljk$ for the present operating zone $Zjk$ is read from an initial value map in step S118.

In step S119, it is determined whether the maximum value $Vp$ is larger than the reference level $Ljk$. When it is determined that the former is larger than the latter, that is, when it is determined that knock occurs, the feedback correction value $Afb$ is corrected to retard the ignition timing by adding to the feedback correction value $Afb$ the product of the difference between the maximum value $Vp$ and the reference level $Ljk$ and a predetermined coefficient $\alpha$ in step S120. Then in step S121, it is determined whether the corrected feedback correction value $Afb$ is larger than an upper limit $Amax$. When it is determined that the former is larger than the latter, the feedback correction value $Afb$ is limited to the upper limit Amax in step S122. On the other hand, when it is determined in the step S119 that knock does not occur, the feedback correction value Afb is corrected to advance the ignition timing by subtracting a predetermined value Aad from the feedback correction value Afb in step S123. Then in step S124, it is determined whether the corrected feedback correction value Afb is larger than 0. When it is determined that the former is smaller than the latter, the feedback correction value Afb is limited to 0 in step S125.

In step S126, it is determined whether the present operating zone Zjk is the same as the preceding operating zone. When it is determined that the present operating zone Zjk is the same as the preceding operating zone, it is determined in step S127 whether the difference between the maximum value Vp and the reference level Ljk is larger than a predetermined value Skn. This step is for eliminating an excessively large maximum value Vp from calculation of the average value in order to reduce influence of excessively large knock and noise on the reference level.

When it is determined in the step S127 that the difference between the maximum value Vp and the reference level Ljk is not larger than the predetermined value Skn, the memory value Mi corresponding to the level of the present maximum value Vp input into a memory for distribution calculation is incremented, the frequency of the maximum value Vp of the level is obtained and the number Nc of the cumulated maximum values Vp is calculated in order to calculate the distribution for the maximum values Vp. (steps S128 and S129)

Then in step S130, it is determined whether learning is completed on the basis of whether the number of the cumulated maximum values Vp reaches a predetermined value No. When it is determined that learning is completed, an average AVp of the maximum values Vp is calculated on the basis of a cumulative value Vt of the maximum values Vp in step S131. In step S132, the maximum frequency Mm is obtained from the memory Mi of the frequency, and a coefficient K for calculating the reference value is calculated according to the value of the maximum frequency Mm. Since the standard deviation is apt to become small as the value of the maximum frequency Mm becomes large, the coefficient K is set to be smaller as the value of the maximum frequency Mm increases. Then in step S133, the reference level Ljk is calculated on the basis of the average AVp and the coefficient K.

Figure 17:
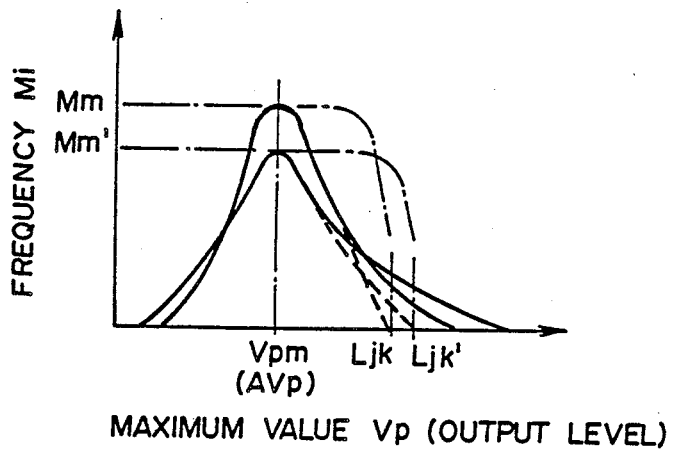
FIG. 17 is a view for illustrating the setting characteristics of the reference level against the distribution characteristics in the third embodiment.

That is, as shown in FIG. 17, as the value of the maximum frequency Mm which substantially corresponds to the average AVp becomes larger, the distribution width becomes narrower, while as the value of the maximum frequency Mm becomes smaller, the distribution width becomes wider. Taking into account this fact, the coefficient K is set to be inversely proportional to the maximum frequency Mm and the reference level Ljk is obtained by multiplying the average AVp by the coefficient so that the reference level Ljk is determined according to the distribution characteristics.

Steps S134 to 139 are for reflecting the initial learning value for an operating zone to other operating zones. In the step S134, it is determined whether the present operating zone Zjk has ever learned. When it is determined that the present operating zone Zjk has learned, it is determined whether the learning reflection permission flag Fre has been set to 1 in the step S135. When it is determined that the learning reflection permission signal Fre has been set to 1, it is determined in the step S136 whether the ratio of the reference level Ljk obtained at this time to the reference level Ljkm stored in the learning map is larger than a predetermined value Ra, and it is determined in the step S137 whether the ratio Ljk/Ljkm is smaller than a predetermined value Rb. When the ratio Ljk/Ljkm is larger than the predetermined value Ra or smaller than the predetermined value Rb, the learning reference levels Ljkm for all the operating zones other the present operating zone are corrected using the ratio Ljk/Ljkm as a coefficient in the step S138, and the learning reflection permission flag Fre is cleared in the step S139.

The reference level Ljk thus obtained is written in a predetermined zone Zjk of a reference level learning map allocated to the corresponding cylinder to update the learning value in step S140. Then registers Mi and Nc for distribution calculation are cleared in step S141, the preceding zone Zjk is updated in step S142, and the peak holding circuit 48 is reset in step S143.

In this embodiment, the average AVp and the maximum frequency Mm are obtained as statistical characteristic values of the maximum value Vp of the output of the knocking sensor 4, and the reference level Ljk is set by multiplying the average AVp by the coefficient K set on the basis of the maximum frequency Mm related to the distribution, thereby further improving knock detecting accuracy and knock control accuracy.

A fourth embodiment of the present invention will be described with reference to FIGS. 18 to 22, hereinbelow. The fourth embodiment is substantially the same as the first embodiment in the mechanical and electronic arrangement except that the control to be made by the control unit differs from that of the first embodiment, and the knock detecting circuit is somewhat different from that shown in FIG. 4 as shown in FIG. 18.

In the fourth embodiment, the maximum value Vp is detected a plurality of times and a maximum frequency value Vpm which is the value of the maximum value Vp which appears most frequently is statistically obtained on the basis of the frequency distribution characteristics. Then the reference level is set on the basis of the maximum frequency value Vpm.

Figure 18:
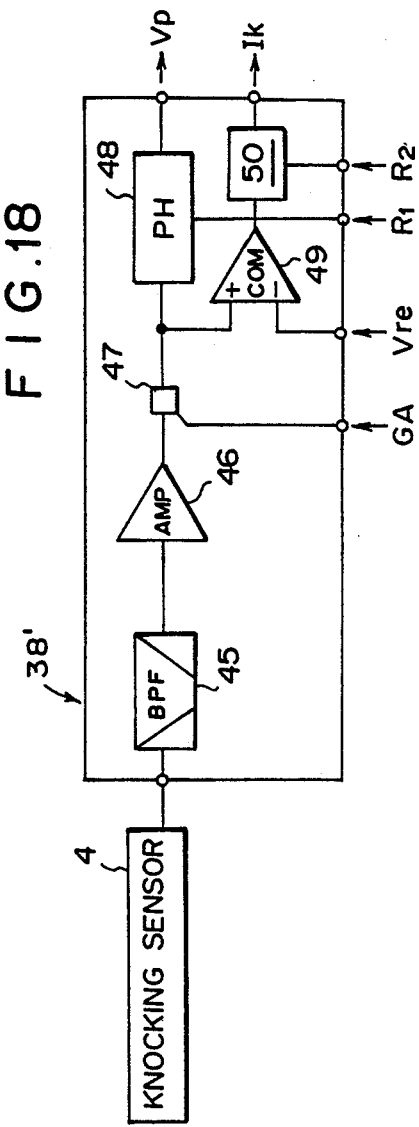
FIG. 18 is a block diagram showing the knock detecting circuit employed in a fourth embodiment of the present invention, and FIGS. 19 to 22 flow charts for showing the operation of the engine control unit in a fourth embodiment of the present invention.

The knock detecting circuit 38' shown in FIG. 18 is substantially the same as that shown in FIG. 4 except that the input AMP 46 is not provided with the analog switches 51 and 52 for controlling the gain thereof, and accordingly the analogous parts are given the same reference numerals and will not be described here.

Figure 19:
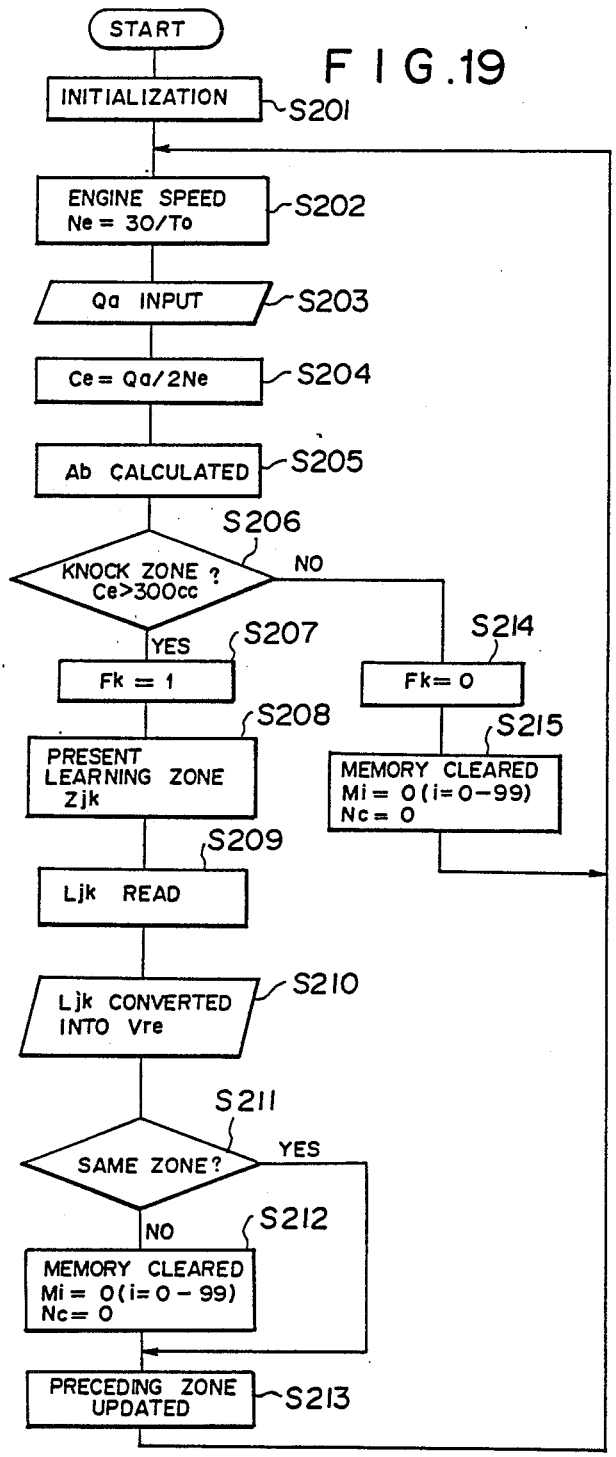

The operation of the control unit 14 in this embodiment will be described with reference to the flow charts shown in FIGS. 19 to 21, hereinbelow. FIG. 19 shows a main routine. Step S201 is an initialization step. In step S202, the engine speed Ne is calculated on the basis of TDC cycle To derived from the crank angle signal. In step S203, the intake air amount Qa is read from the output of the airflow meter 18. Then the charged volume Ce representing the engine load is calculated on the basis of the engine speed Ne and the intake air amount Qa, and a basic ignition timing Ab is calculated from a basic map in which the engine speed Ne and the charged volume Ce are related. (Steps S204 and S205)

In step S206, it is determined whether the operating condition is in the knock zone on the basis of the charged volume Ce. When it is determined that the operation condition is in the knock zone, a knock control flag Fk is set to 1 in step S207, and then the present learning zone Zjk is obtained from a zone map of the engine speed Ne and the charged volume Ce in step S208. In step S209, a learning value Ljk is read from a learning map corresponding to the present learning zone Zjk. In step S210, the learning value Ljk is converted into a voltage Vre as the reference level and delivered to the D/A convertor 39. The zone map and the learning map may the same as those described above in conjunction with the first embodiment.

In step S211, it is determined whether the present learning zone Zjk is the same as the preceding learning zone. When it is determined that the former is the same as the latter, the flow directly proceeds to step S213, and otherwise, the flow proceeds to the step S213 after the learning memories Mi and Nc are cleared in step S212. In the step S213, the learning zone Zjk is updated.

When it is determined in the step S206 that the operating condition is not in the knock zone, the flow proceeds to step S214 and the knock control flag Fk is cleared to 0. Further, the learning memories Mi and Nc are cleared in step S215.

Figure 20:
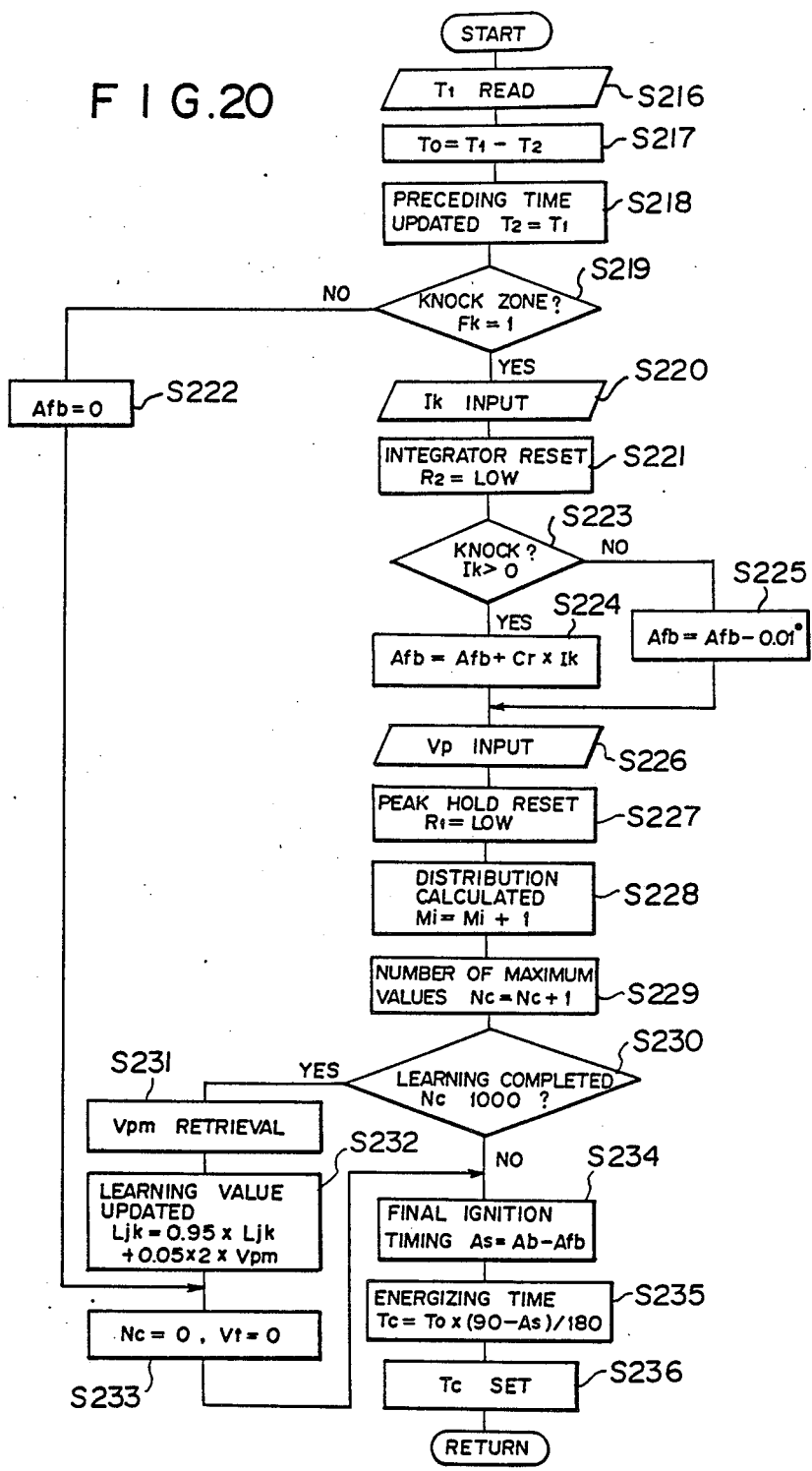

FIG. 20 shows an interrupt routine which is started by a signal input every 60 degrees ATDC. In step S216, an interrupt time T1 is read from the free running counter 31, and in step S217, the TDC cycle To, the time required for the crankshaft to make a half revolution (180°), is calculated on the basis of the difference between the present interrupt time T1 and the preceding interrupt time T2. Thereafter, the preceding interrupt time T2 is updated in step S218.

In step S219, it is determined on the basis of the knock control flag Fk set in the main routine whether the operating condition is in the knock zone. When it is determined that the operating condition is in the knock zone, the knock intensity Ik is read from the knock detecting circuit 38 in step S220, and a reset signal R2 at low level is input into the integrator 50 to reset the knock intensity Ik in step S221. On the other hand, when it is determined in the step S219 that the operating condition is not in the knock zone, the feedback correction value Afb is cleared to 0 in step S222.

In step S223, it is determined whether knock occurs on the basis of whether the knock intensity Ik is detected. When it is determined that the knock occurs, the feedback correction value Afb is corrected to retard the ignition timing according to the knock intensity Ik (Afb=Afb+Cr×Ik, Cr being a coefficient) in step S224. On the other hand, when it is determined that knock does not occur, the feedback correction value Afb is corrected to advance the ignition timing by a predetermined value in step S225.

After the feedback correction value Afb is corrected in the manner described above, the maximum value Vp (peak voltage) is input from the peak holding circuit 48 in step S226. Then in step S227, a reset signal R1 at low level is output to the peak holding circuit 48 to reset the maximum value Vp. In step S228, the distribution for the maximum value Vp is calculated. In this calculation, the memory value Mi corresponding to the level (voltage) of the present maximum value Vp input into a memory for distribution calculation is incremented. For example, the intensity of the output level is zoned into 100 zones, and registers are provided for the respective zone numbers i. Then the frequency of the maximum value Vp of a given level is obtained by incrementing the register of the corresponding number. In step S229, the number Nc of the cumulated maximum values Vp is calculated.

In step S230, it is determined whether the number Nc of the cumulated maximum values Vp reaches a predetermined number, e.g., 1000, thereby determining whether learning is completed. When it is determined that learning is completed, the maximum value Vmp corresponding to the maximum point Mm at which the frequency for the maximum value Vp is maximum is retrieved from the memory for distribution calculation. (step S231) For example, this retrieval can be effected, as shown in sub routine in FIG. 22, by repeating comparison of a pair of memory values Mi with each other while eliminating smaller ones and adopting as the maximum frequency value Vpm the output level corresponding to the memory number m of the memory value Mm determined to be larger at the final comparison.

Then in step S232, the learning value Ljk of the present learning zone Zjk is updated on the basis of the maximum frequency value Vpm, and in step S233, registers Mi and Nc for learning are cleared. This updating of the learning value Ljk is effected by multiplying 5% of the maximum frequency value Vpm by a predetermined coefficient (2) and adding the product to 95% of the preceding learning value to avoid large fluctuation of the learning value. Since the coefficient is for obtaining a level corresponding to the noise distribution width from the maximum frequency value Vpm, it is preferred that the coefficient be changed according to the maximum frequency Mm taking into account the fact that the noise distribution width becomes narrower as the maximum frequency Mm increases. For example, this can be done by setting the coefficient as a function of the maximum frequency Mm to be reduced as the maximum frequency Mm increases.

On the basis of the basic ignition timing Ab and the feedback correction value Afb obtained in the manner described above, the final ignition timing As is calculated in step S234. In step S235, the time Tc between 90 degrees BTDC at which the first crank angle signal from the first crank angle sensor 25 turns to low level and the final ignition timing As (energizing time) is calculated, and in step S42, the third PTM 34 is set according to the energizing time. The third PTM 34 is triggered by the crank angle signal at 90 degrees BTDC and the ignition signal is output after the time Tc.

Figure 21:
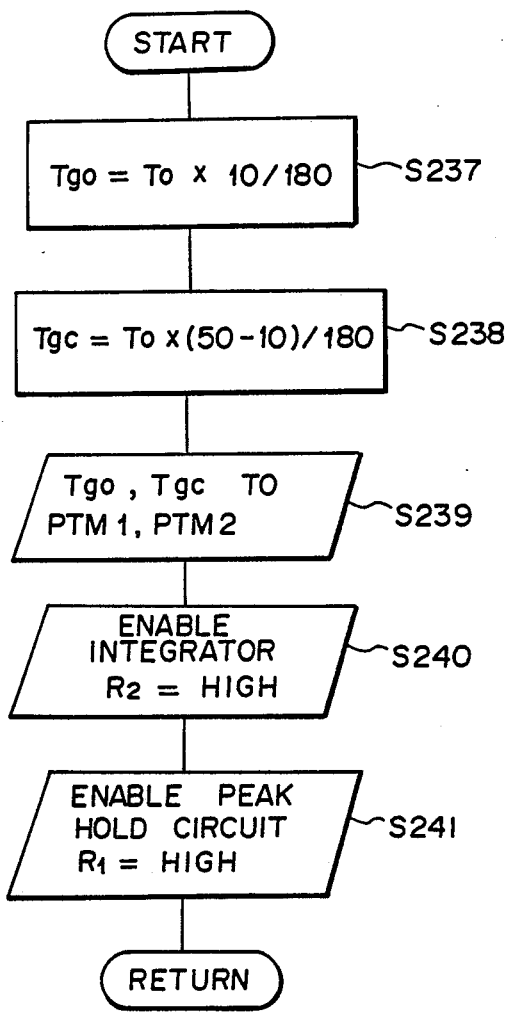

FIG. 21 shows a second interrupt routine which starts every 30 degrees BTDC and which is for setting and outputting the gate signal GA for the analog switch 47 in the knock detecting circuit 38. In step S237, the time interval Tgo from the TDC to 10 degrees ATDC at which the analog switch 47 is opened is calculated, and in step S238, the time interval Tgc from 10 degrees ATDC to 50 degrees ATDC at which the analog switch 47 is closed is calculated. In step S239, the time intervals Tgo and Tgc are respectively output to the first and second PTMs 32 and 33 to open the analog switch 47 Tgo after TDC and to close the same Tgc thereafter, thereby preventing noise generated by closure of the intake valve from being input into the peak holding circuit 48 and the comparator 48. Further, reset signals R1 and R2 at high level are output to the integrator 50 and the peak holding circuit 48, which have been reset at the steps S221 and S227, to enable them to operate. (steps S240 and S241)

In the embodiment described above, the maximum value Vp of the detecting signal of the knocking sensor 4 in a predetermined period during which knock occurs is obtained and a predetermined number of maximum values Vp is statistically processed to obtain a frequency distribution characteristics for the maximum value Vp. The maximum frequency value Vpm which is the value of the maximum value Vp which appears most frequently is related to the reference level and the noise distribution. The reference values set for the maximum frequency values Vpm are stored in the learning map and is output to the comparator 49 according to the operating condition. The comparator 49 compares the reference level with the output of the knocking sensor 4 and according to the output signal of the comparator 49, the ignition timing is feedback-controlled to suppress the knock. Since normal distribution for noise is substantially symmetric with respect to the maximum frequency value, the reference level can be set at the boundary of the upper limit of the normal distribution for noise and the distribution range upon knock occurrence. Accordingly, this embodiment can follow change in distribution characteristics.

We claim:

1. An engine knock detecting system comprising
   an oscillation sensor which is mounted on an engine to detect oscillation of the engine and outputs a signal representing the oscillation of the engine,
   a maximum value detecting means which detects the maximum value of the output of the oscillation sensor at least during combustion period in each cycle,
   a memory means which receives the output of the maximum value detecting means and stores frequency of a plurality of maximum values by which the respective maximum values are detected in a predetermined number of cycles, and
   a determining means which determines knock occurrence on the basis of the maximum value which is detected most frequently.

2. An engine knock detecting system as defined in claim 1 in which said determining means comprises a calculating means which receives the output of the memory means and calculates a reference value on the basis of the maximum value which is detected most frequently and a comparator means which determines whether knock occurs on the basis of comparison of the output of said oscillation sensor with the reference value.

3. An engine knock detecting system as defined in claim 2 in which said calculating means calculates said reference value by multiplying said maximum value which is detected most frequently by a predetermined coefficient.

4. A knock detecting system as defined in claim 2 in which said calculating means calculates said reference value by adding a standard deviation for distribution characteristic for a plurality of the maximum values to the maximum value which is most frequently detected.

5. An engine knock detecting system as defined in claim 1 which said determining means comprises a calculating means which receives the output of the memory means and calculates a reference value on the basis of an average of a plurality of the maximum values and the maximum value which is detected most frequently and a comparator means which determines whether knock occurs on the basis of comparison of the output of said oscillation sensor with the reference value.

6. An engine knock control system comprising
   an oscillation sensor which is mounted on an engine to detect oscillation of the engine and outputs a signal representing the oscillation of the engine,
   a maximum value detecting means which detects the maximum value of the output of the oscillation sensor at least during combustion period in each cycle,
   a determining means which receives the output of the maximum value detecting means and determines knock occurrence on the basis of the maximum value which is detected most frequently,
   an operating condition detecting means which detects the operating condition of the engine and outputs a signal representing the engine operating condition,
   a basic control variable determining means which receives the output of the operating condition detecting means and determines a basic control variable for at least one control factor governing combustion in the engine, and
   a correction means which receives the output of the determining means and corrects the output of the basic control variable determining means to suppress knock upon knock occurrence.

7. A knock control system as defined in claim 6 in which said control factor is the ignition timing and said correction means retards the ignition timing upon knock occurrence.

* * * * *